United States Patent [19]
Evans

[11] 3,885,390
[45] May 27, 1975

[54] INTERNAL COMBUSTION AND STEAM PRESSURE GENERATOR WITH POWERED EXPANSION ENGINE

[76] Inventor: Glen R. Evans, Rt. 1, Box 145, Isanti, Minn. 55040

[22] Filed: Feb. 12, 1974

[21] Appl. No.: 441,841

[52] U.S. Cl. .................................................. 60/531
[51] Int. Cl. ............................................. F03g 7/06
[58] Field of Search........... 60/531, 39.18 B; 122/41

[56] References Cited
UNITED STATES PATENTS

| 826,080 | 7/1906 | Alz ......................................... 122/41 |
| 884,223 | 4/1908 | Shipley ............................ 122/41 UX |
| 886,274 | 4/1908 | Tate ............................... 60/39.18 B |
| 1,240,804 | 9/1917 | Alexander ............................. 122/41 |
| 2,049,652 | 8/1936 | Jolley ..................................... 122/41 |

Primary Examiner—Martin P. Schwadron
Assistant Examiner—H. Burks, Sr.
Attorney, Agent, or Firm—Clarence A. O'Brien; Harvey B. Jacobson

[57] ABSTRACT

A pressure generator is provided and comprises a closed pressure vessel having a generally central partition dividing the interior of the vessel into first and second chambers, the partition being provided with a restricted flow passage therethrough. Pressure type fluid fuel atomizing structure opens into the first chamber as well as a pressurized air inlet being in communication with any suitable source of compressed air. The first chamber is also provided with ignition structure whereby a combustible mixture of atomized liquid fuel and air admitted into the first chamber may be ignited. The second chamber includes pressure type water atomizing structure for introducing a fine spray of atomized water into the second chamber and the latter also includes a pressure valve controlled expanded gas outlet for ducting expanded gases from the second chamber to an expansion engine. A mixture of atomized liquid fuel and air is continuously burned in the first chamber and the resultant highly heated expanding gaseous by-products of combustion pass through the restricted flow passage in the partition and into the second chamber in which the finely atomized water introduced thereinto is substantially instantaneously flashed into steam thereby providing tremendous volumes of expanded gases for ducting to the associated expansion engine at temperatures appreciably reduced relative to the temperature of the by-products of combustion generated in the first chamber of the pressure vessel.

5 Claims, 2 Drawing Figures

INTERNAL COMBUSTION AND STEAM PRESSURE GENERATOR WITH POWERED EXPANSION ENGINE

BACKGROUND OF THE INVENTION

Conventional internal combustion engines may have a reasonably high volumetric efficiency, but the thermal efficiency of conventional internal combustion engines is quite low. Accordingly, much of the energy produced by fuel burned in the engine is wasted. In the conventional reciprocating piston internal combustion engine critical portions of the engine exposed to combustion temperatures must be cooled either by liquid or by air in order to enable petroleum type lubricants to be able to properly lubricate the relatively movable components of the engine. Although gas turbines may operate at much higher temperature levels with proper lubrication of the relatively movable components maintained, turbine engines also lose a considerable amount of the heat energy generated to the ambient atmosphere and have the operating characteristic of operating at maximum efficiency at high speeds.

Accordingly, turbine engines are more difficult to adapt for vehicular power purposes. Also, gas turbine engines require sophisticated metallurgy products to withstand the more efficient high operating temperatures and these products are very expensive. On the other hand, the reciprocating piston internal combustion engine is reasonably adaptable to vehicular use and therefore has gained far more popularity in this environment than gas turbine engines.

In addition to gas turbine engines and reciprocating piston internal combustion engines there has been in the past attempts to construct engines which will include the better operating characteristics of the gas turbine and reciprocating piston internal combustion engines. As a result of these attempts external combustion engines of the reciprocating piston type have been designed. These engines utilize external combustion chambers into which a selected combustible mixture is continuously pumped and burned and the expanding gases of combustion are then ducted to the reciprocating piston expansion engine. By this construction, the combustion chamber is at least somewhat remotely disposed relative to the working chamber or chambers of the expansion engine and thus the problem of operating temperatures sufficiently high to be not compatible with conventional petroleum lubrication products is somewhat alleviated. However, if the combustion chamber is sufficiently remote from the working chambers of the expansion engine to reduce the temperature of the expanding gases introduced into the working chambers sufficiently to substantially eliminate all problems of lubrication stemming from extremely high operating temperatures thermal efficiency is sacrificed to a point which is not appreciably higher than the thermal efficiency of reciprocating piston internal combustion engines.

SUMMARY OF THE INVENTION

The pressure generator of the instant invention operates in a manner such that a fully insulated pressure vessel contains the pressures and extreme temperatures of continuous combustion and the expanded gases are then ducted but a short distance into a supplemental expansion chamber into which atomized water is introduced under high pressures for substantially instantaneous flashing into steam. By this method the extremely high temperatures of continuous combustion are reduced but are substantially contained within the fully insulated pressure vessel by the absorption of heat during the process of the flash transformation of atomized water into steam. Thus, the already expanding combustion gases are greatly reduced in temperature and further expanded to a great degree as the water introduced into the pressure vessel in atomized form is flashed into steam. The steam generated in the second chamber of the pressure vessel is then ducted to a conventional expansion engine of the steam type. The expansion engine may be of the reciprocating piston or other positive displacement or turbine type. However, the reciprocating piston and other positive displacement types of steam engines are far more readily adaptable to vehicular use inasmuch as they have great capacity for generating high torque at low engine speed. The requisite air, fuel and water pumps for supplying air, fuel and water under pressure to the first and second chambers of the pressure vessel may be driven from the positive displacement steam or other gas pressure expansion engine.

The main object of this invention is to provide an internal combustion and steam pressure generator of high thermal efficiency and particularly well adapted to be utilized in supplying adequate steam or other gas pressure to a steam-type positive displacement expansion engine.

Another object of this invention is to provide a power generating assembly in accordance with the preceding object that will be particularly well adaptable for use in powering vehicles of various types.

A final object of this invention to be specifically enumerated herein is to provide an apparatus in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENT

Figure 1:
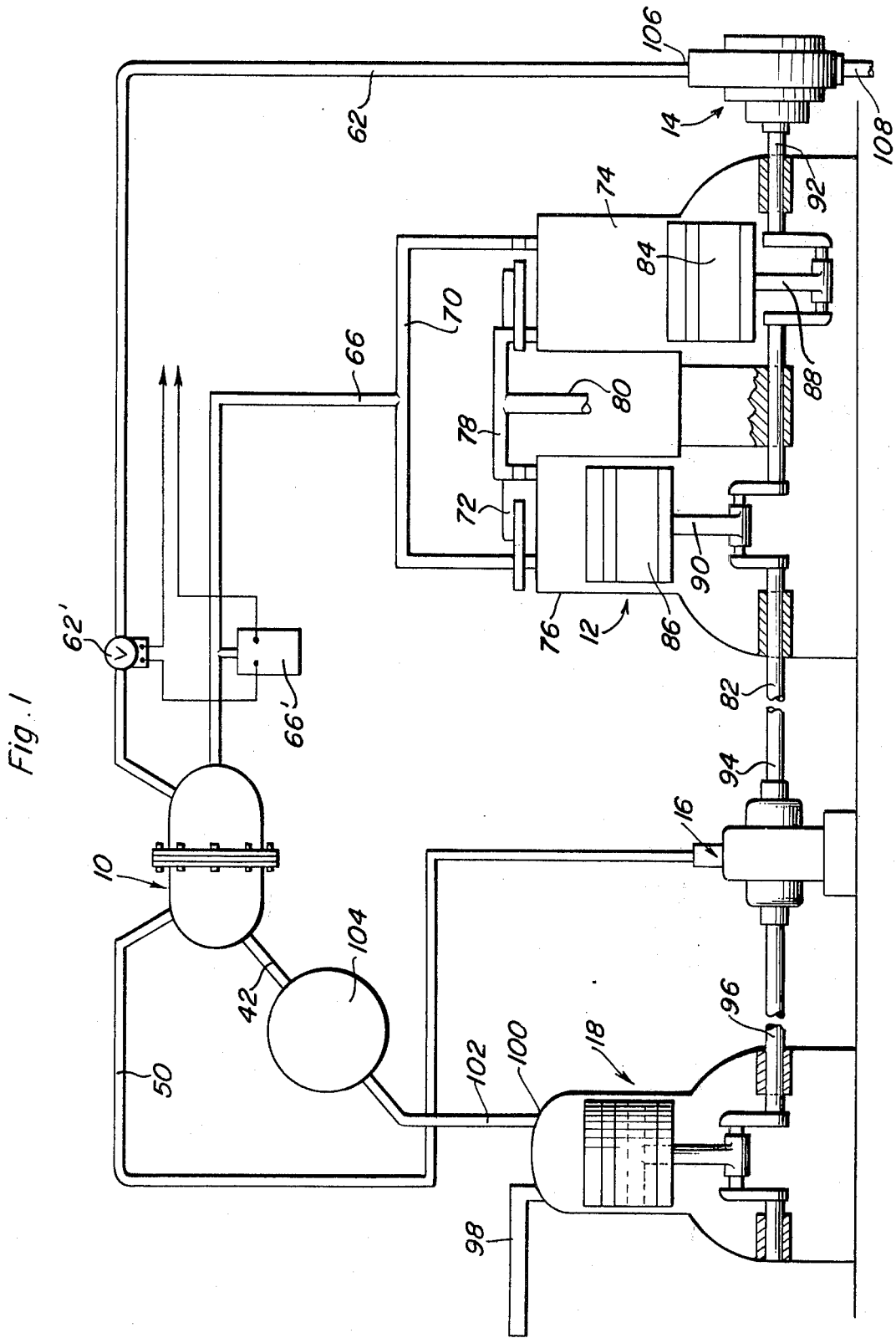
FIG. 1 is a schematic view of a power generating system constructed in accordance with the present invention.

Referring now more specifically to the drawings, the numeral 10 generally designates an internal combustion and steam or other gas pressure generator, the numeral 12 generally designates a conventional form of reciprocating piston positive displacement engine, the numeral 14 generally designates a water pump, the numeral 16 generally designates a liquid fuel pump and the numeral 18 generally designates an air compressor.

Figure 2:
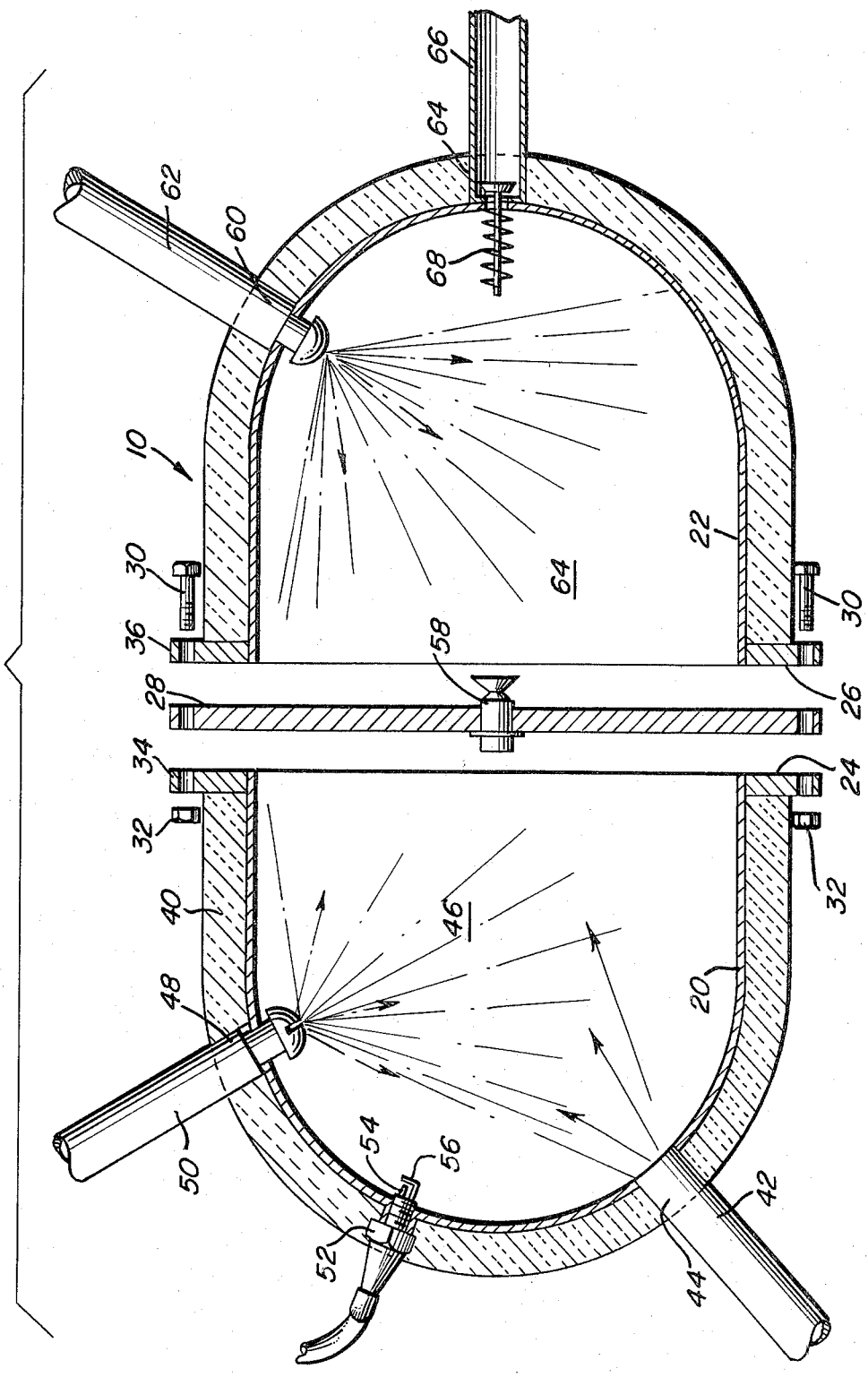
FIG. 2 is an enlarged exploded vertical sectional view taken substantially upon the plane passing through the longitudinal centerline of the pressure vessel.

With attention now invited more specifically to FIG. 2 of the drawings it may be seen that the internal combustion and steam or other gas pressure generator 10 comprises a pressure vessel including first and second sections 20 and 22 including flanged open ends 24 and 26. The flanged open ends 24 and 26 are aligned with and oppose each other and a partition 28 is disposed between the flanged ends 24 and 26, the latter being secured together by means of removable fasteners 30 and 32 secured through the flanges 34 and 36 carried by the flanged ends 24 and 26 and the outer peripheral portion of the partition 28. In this manner, the outer peripheral portions of the partition 28 are tightly clamped between the flanged ends 24 and 26.

The pressure vessel, except for the outer peripheral portions of the flanges 34 and 36 and the partition 28 through which the fasteners 30 are secured, is completely encased within a covering 40 of heat insulative material. A compressed air supply line 42 includes an outlet end 44 which opens into the first chamber 46 defined in the pressure vessel 10 to the left of the partition in FIG. 2 and the atomizing head equipped discharge end 48 of a pressure fuel line 50 also opens into the chamber 46. Still further, a conventional igniter 52 is supported from the section 20 with its spaced electrodes 54 and 56 disposed within the chamber 46.

The partition 28 has a central tubular fitting 58 secured therethrough and it is to be noted that the fitting 58 will be constructed of a material having a high resistance to high temperatures. The discharge end 60 of a spray head equipped water or other liquid supply line 62 opens into the chamber 64 defined within the section 22 to the right of the partition 28 and the inlet end 64 of a gas pressure conduit 66 is equipped with a pressure control valve 68 and opens into the interior of the chamber 64.

The outlet end of the gas pressure conduit 66 opens into a steam header 70 of the two cylinder reciprocating piston engine 12 and the engine 12 includes an engine driven slide valve assembly 72 for controlling the admission of steam pressure from the header 70 into the cylinders 74 and 76 of the engine 12. Also, the slide valve assembly 72 controls the exhausting of expanded steam from the cylinders 74 and 76 into an exhaust header 78 opening into an exhaust line 80.

The engine 12 includes a crankshaft 82 to which pistons 84 and 86 reciprocal in the cylinders 74 and 76 are connected by means of connecting rods 88 and 90. The right hand end of the crankshaft 82 is operatively coupled to the input shaft 92 of the water pump 14 and the left hand end of the crankshaft 82 is coupled to the input shaft portion 94 of the fuel pump 16. The input shaft portion 94 extends through the fuel pump 16 and is coupled to the input shaft portion 96 of the air compressor 18, the latter being of the reciprocating piston type. The air compressor 18 includes an air inlet 98 and an air outlet 100 to which the inlet end of a conduit 102 extending to an accumulator 104 is connected. The supply line or pressurized air pipe 42 extends from the accumulator 104 into the chamber 46 of the pressure vessel 10. The fuel pump 16 may be communicated with any suitable source of liquid fuel by means of an inlet (not shown) and includes an outlet to which the inlet end of the line or pipe 50 is connected. Also, the water or other liquid pump 14 includes an outlet 106 to which the inlet end of the line or conduit 62 is connected and also an inlet 108 which may be connected to any suitable source of water or other liquid capable of being vaporized when heated.

In operation, the air compressor 18 continuously supplies air under pressure to the chamber 46 through the accumulator 104 and the fuel pump 16 continuously supplies fuel under pressure to the spray head disposed within the chamber 46 and carried by the outlet end 48 of the supply line 50. Thus, a combustible mixture of fuel and air is continuously supplied to the interior of the chamber 46, the igniter 52 serving to ignite this mixture initially. After combustion is initiated in the chamber 46 operation of the igniter 52 may be terminated, inasmuch as combustion within the chamber 46 will be self-sustaining.

As the combustible mixture within the chamber 46 is burned it expands rapidly and is forced through the fitting 58 secured through the central portion of the partition 28 and then passes into the interior of the chamber 74 at extremely high temperatures and high pressures. These extremely high temperature gases substantially instantaneously flash the water or other liquid being discharged into the chamber 64 from the line 62 into steam or pressurized gas and the resultant high volume of steam or pressurized gas is discharged through the conduit 66 to the engine 12 for operation of the latter. As hereinbefore set forth, the engine 12 then drives the water or other liquid pump 14, the fuel pump 16 and the compressor 18. The rate of flow of water or other liquid under pressure through the line 62 is controlled by a variable flow control valve 62' disposed in the line 62 and under the control of a thermostatic control 66' operatively associated with the line 66. The valves are electrically actuated and increases and decreases in temperature in the line 66 result in increases and decreases, respectively, in the rate of flow of liquid through valve 62'.

Inasmuch as the extremely high temperature combustion gases, after passing through the fitting 58, are used to flash the atomized liquid being pumped into the chamber 64 into steam or pressurized gas the temperature of these combustion gases is greatly reduced with substantially all of the reduction in energy realized by the reduction of temperature gained back by the formation of steam or other pressurized gas in many times larger volume. This steam or other pressurized gas, at a temperature substantially reduced in relation to the temperature of combustion within the chamber 46, is ducted to the engine 12.

Inasmuch as the vessel 10 is fully insulated and the conduit 66 may also be heavily insulated reduction of thermal efficiency of the combined power generating assembly is maintained at a minimum and conventional petroleum lubricants may be utilized in the engine 12.

Of course, conventional condensers may be utilized to convert the gas being exhausted from the engine 12 back into water or other liquid for return to the source thereof with which the pump inlet 108 is communicated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A pressure generator comprising a closed bulbous pressure vessel including an internal transverse partition dividing the interior of the vessel into at least first and second chambers, first pump driven supply means for pumping air and fluid fuel, under pressure, into said first chamber, said generator including restricted flow passage means communicating said first and second chambers, said generator further including second pump driven supply means for injecting a spray of vaporizable liquid under pressure into said second chamber for substantially flashing into gas upon being subject to the heat of combustion gases entering said second chamber from said first chamber through said passage means, gas pressure outlet means opening outwardly from the second chamber of said vessel for discharging gas under pressure from said generator, said pressure vessel including a pair of vessel end sections having closed remote ends and open adjacent ends opening toward each other, said partition including outer peripheral edges clamped between and sealed relative to the open ends of said vessel sections and said passage means defining a passage through a central portion of said partition, said pressure vessel further including ignition means operatively associated with the interior of said first chamber for at least initiating the combustion of a combustible mixture therein, and pressure controlling valve means operatively associated with said steam pressure outlet operative to maintain at least a minimum pressure within said second chamber.

2. The combination of claim 1 including an insulative covering in which said vessel is at least substantially fully enclosed.

3. The combination of claim 1 including a positive displacement gas engine having gas inlet means, and means communicating said gas pressure outlet means with said gas inlet means.

4. The combination of claim 3 wherein said gas engine includes a rotary output shaft, air and fluid fuel pumps driven by said output shaft and comprising said first supply means, said air and fluid fuel pumps including compressed air and pressurized fuel outlets communicated with the interior of said first chamber, said second supply means including a vaporizable liquid pump driven from said shaft including a liquid pressure outlet communicated with the interior of said second chamber.

5. The combination of claim 1 including temperature responsive control means operatively associated with said gas pressure outlet means and flow controlling valve means operatively associated with said control means for introducing a spray of liquid into said second chamber, said control means and valve being operatively associated with each other to effect increases and decreases in the quantity of liquid being sprayed into said second chamber in response to increases and decreases in the temperature of the gases in said gas pressure outlet means.

* * * * *